May 27, 1958 J. M. DELANEY 2,836,286
CONVEYOR TROLLEY
Filed Aug. 12, 1955 2 Sheets-Sheet 1
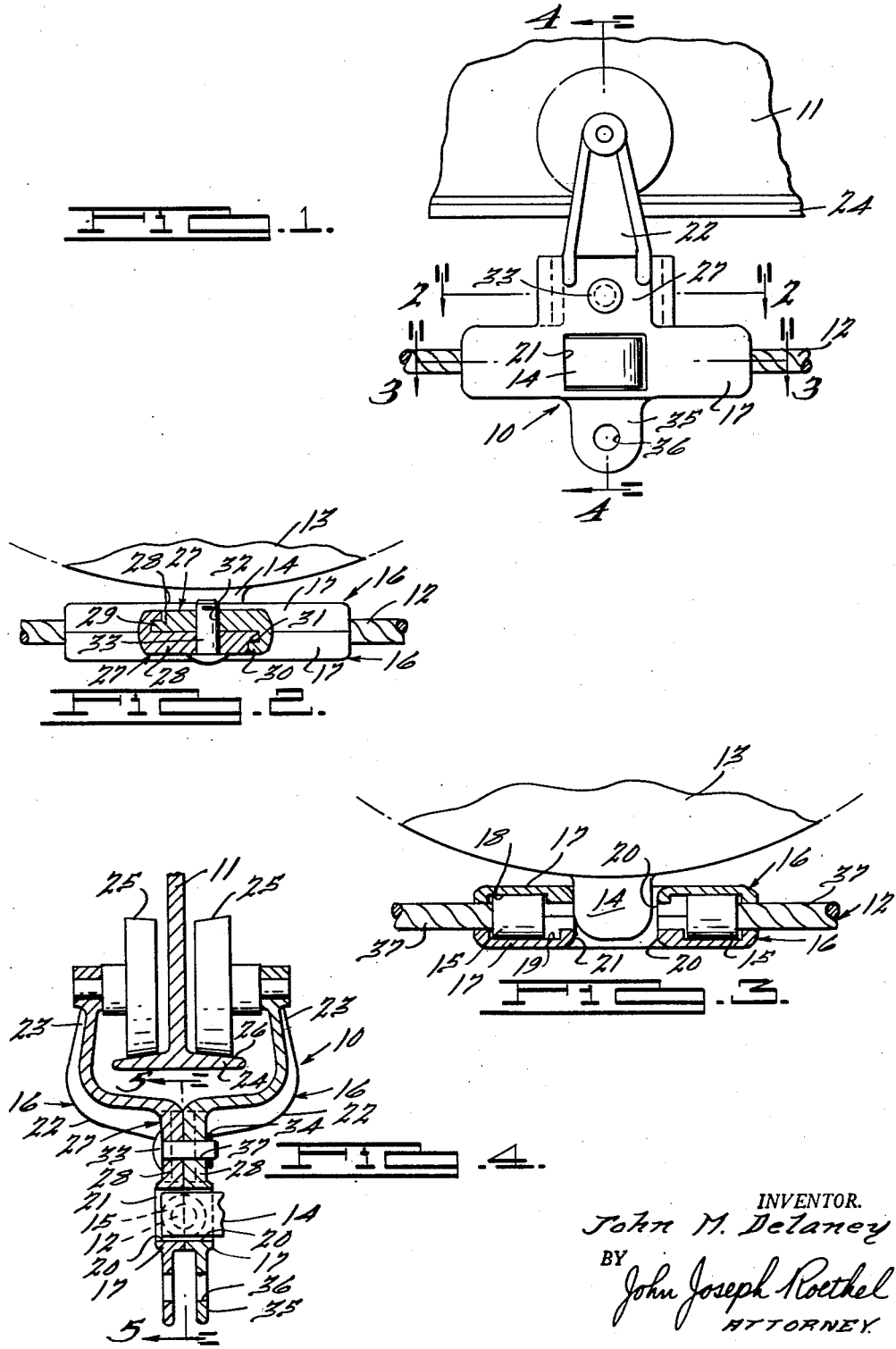
INVENTOR.
John M. Delaney
BY John Joseph Roethel
ATTORNEY.

May 27, 1958
J. M. DELANEY
2,836,286
CONVEYOR TROLLEY
Filed Aug. 12, 1955
2 Sheets-Sheet 2
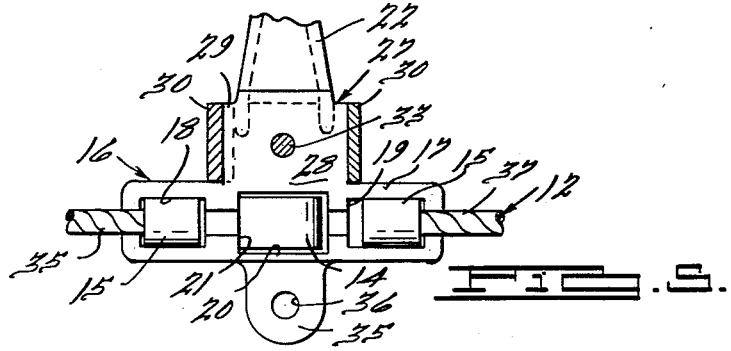
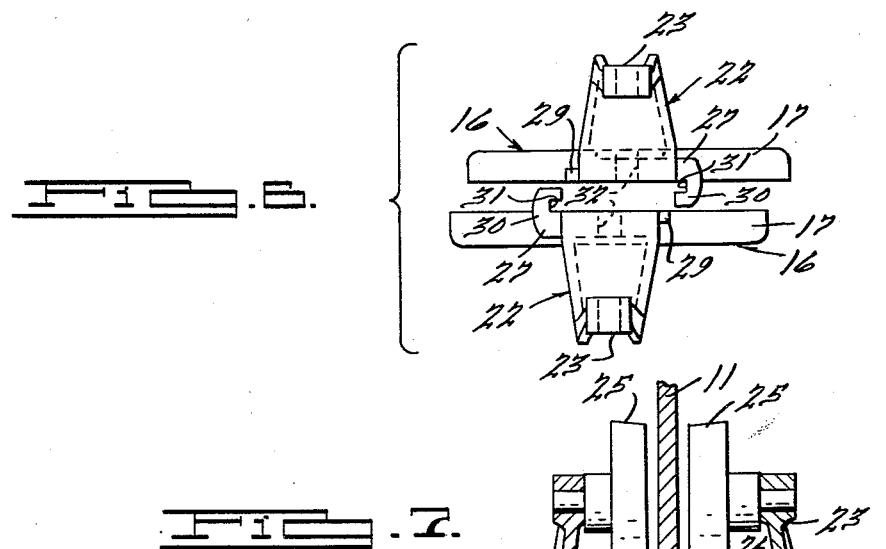
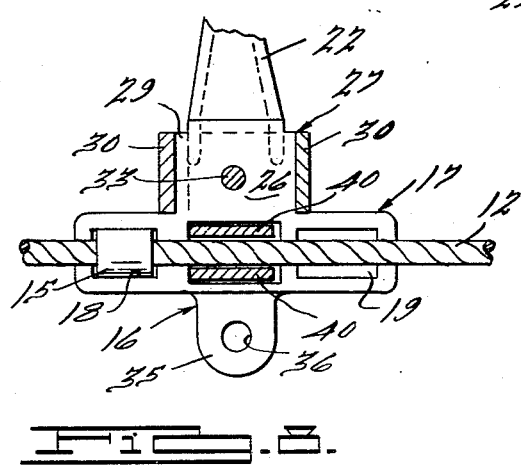
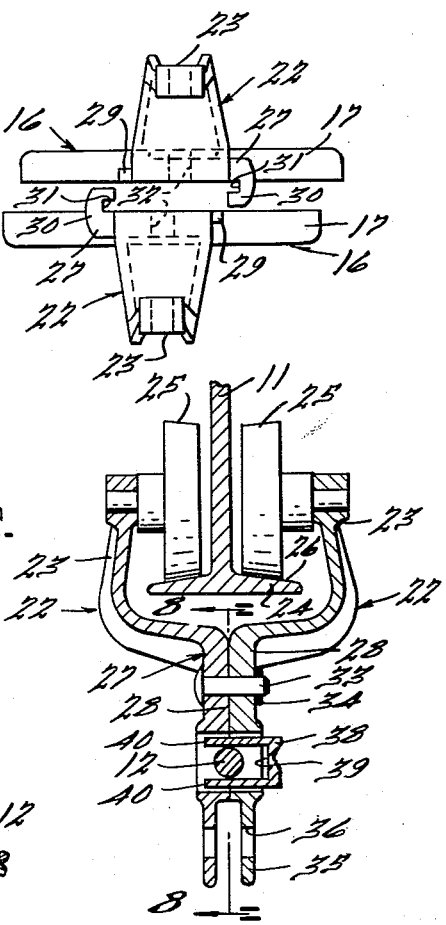
INVENTOR.
John M. Delaney
BY John Joseph Roethel
ATTORNEY

United States Patent Office 2,836,286
Patented May 27, 1958

2,836,286

CONVEYOR TROLLEY

John M. Delaney, Detroit, Mich.

Application August 12, 1955, Serial No. 528,057

2 Claims. (Cl. 198—177)

This invention relates to conveyor systems and more particularly to workpiece transporting units or trolleys adapted to travel along an overhead mono-rail, the trolley units being maintained in spaced moving relationship with each other by flexible cable means.

In its illustrated embodiment the invention consists of an improved trolley unit consisting of mating half sections, each half section comprising a unitary or integral member having a conveyor cable receiving body section, said body section being provided with means drivingly engageable by a conveyor system driving member in a novel and improved manner, and an integrally formed arm section adapted to receive the trolley roller, said arm section being spaced from said body section by a connecting section, the latter being provided with means adapted to coact with complementary means on the mating half section to provide an interlock between the two half sections, said connecting sections also being adapted to receive a common retaining device.

Trolley units consisting of mating half sections, each half section being a unitary member, have heretofore been proposed but have not been satisfactory because of the lack of suitable provision for locking or interlocking the half sections together other than through the use of conventional bolt or pin means. The novel interlocking means provided by the present invention has for its object the reduction of the function of the retaining bolt or pin means to that of merely a position retaining device when the trolley unit is at rest. During operation or movement of the trolley unit along the track, the interlocking construction and arrangement embodied herein provides an effective means of retaining the trolley units intact with a minimum of stress being placed on the retaining bolt or pin.

It is a further object of the present invention to provide an improved trolley unit wherein provision is made for the trolley unit to be engaged by a driving sprocket or the like in a novel manner so as to ensure that driving contact will be made for a maximum degree of rotation of the driving sprocket or the like even though the latter may be of relatively small diameter, such as is necessary when the system is required to have sharp turns or bends therein.

Other objects and features of this invention will appear in the following description and appended claims, reference being had to the accompanying drawings forming a part of this specification wherein like reference characters designate corresponding parts in the several views.

Fig. 1 is a side elevation showing a trolley unit embodying the present invention, the unit being shown suspended from an overhead track, in driving engagement with a sprocket tooth and operatively connected to a flexible cable.

Fig. 2 is a sectional view taken substantially through line 2—2 of Fig. 1 looking in the direction of the arrows.

Fig. 3 is a sectional view taken substantially through line 3—3 of Fig. 1 looking in the direction of the arrows.

Fig. 4 is a view taken substantially through line 4—4 of Fig. 1 looking in the direction of the arrows.

Fig. 5 is a sectional view taken substantially through line 5—5 of Fig. 4 looking in the direction of the arrows.

Fig. 6 is an exploded plan view of the mating half sections of the trolley unit.

Fig. 7 is a view in part similar to Fig. 4 illustrating a modification of the invention.

Fig. 8 is a sectional view taken substantially through line 8—8 of Fig. 7 looking in the direction of the arrows.

This application is a continuation-in-part of my co-pending application, Serial No. 453,738, filed September 2, 1954, now Patent No. 2,732,929.

Before explaining in detail the present invention it is to be understood that the invention is not limited in its application to the details of construction and arrangement of parts illustrated in the accompanying drawing since the invention is capable of other embodiments and of being practiced or carried out in various ways. Also, it is to be understood that the phraseology or terminology employed herein is for the purpose of description and not of limitation.

The improved trolley unit, generally designated 10, embodying the present invention is shown in Fig. 1 in operative association with a fragmentary portion of a flanged beam or mono-rail 11. Although only a single trolley unit is shown, it will be understood that a plurality of such units is provided, each unit being operatively associated with the other trolley units of the system by an inter-linking flexible cable, a fragmentary portion 12 thereof being shown in the drawing. As each trolley unit passes a driving gear, sheave or sprocket, a fragmentary portion 13 thereof being shown in Figs. 2 and 3, it is adapted to be drivingly engaged by a driving tooth 14 carried on the driving gear, sheave or sprocket. Through this driving engagement the engaged trolley unit 10 is propelled along the mono-rail 11, the inter-linking cable 12 causing all other trolley units in the system to be moved along at a uniform rate and in proper spaced relationship. The cable 12 is associated with the trolley unit by means of driving lugs 15 as will be explained in greater detail.

Each conveyor trolley unit 10 comprises a pair of mating identical half sections 16 adapted to be placed in face to face contact with each other to form the unit body. Each half section is provided with an elongated horizontally extending body section 17. Each body section 17 is provided with a pair of spaced semi-cylindrical lug receiving cavities 18 and 19 respectively, the cavity 19 being longer than the cavity 18 for a reason to become apparent. When the two half sections 16 are placed in face to face contact, a cavity or recess 18 will be opposed to a cavity or recess 19 and the two together form a cylindrical recess adapted to receive a driving lug 15. The end walls of the cavities 18 and 19 are bored through to accommodate the cable 12.

Between the cavities or recesses 18 and 19 each body section 17 is provided with an aperture 20, the aperture being substantially rectangular in shape with its longitudinal axis extending in the direction of the longitudinal axis of the body section 17. When the half sections 16 are placed in face to face contact, the apertures 20 in effect provide a transversely extending opening through the center of the trolley unit. It is the end wall, for example, the end wall 21, of this opening formed by the aligned apertures 20 that is engaged by the driving tooth 14 to propel the trolley unit along the rail 11.

Each half section body section 17 has appended thereto an upwardly extending arm section 22. This arm section 22 is provided with an outwardly flaring upper portion 23. When the two half-sections 16 are assembled the upper portions 23 are spaced a sufficient distance apart to provide clearance for the lower flange 24 of the mono-rail 11 therebetween. Flanged rollers 25 are suitably journalled on the upper portions 23 of the arm sections 22 inwardly thereof in position to travel on the upper surface 26 of the mono-rail 11.

The arm section 22 of each trolley unit half section 16 is spaced from yet integrally connected to the body section 17 by a connecting section 27. Each connecting section comprises a vertically extending plate portion 28 having at one vertical side edge a lip or tongue 29 and at the other vertical side edge an appendage 30 projecting forwardly of the plane of the face of the half section 16 and provided with a groove 31 therein. The foregoing tongue and groove construction is best viewed in Fig. 6 wherein the two half sections 16 are shown as they would appear just prior to being placed in face to face contact. It will be readily understood that the two half sections would be moved from their respective positions shown in Fig. 6 directly toward each other and then moved laterally so as to cause each lip or tongue 29 to interlock within the receiving groove 31, thereby inter-locking the two half sections 16 together as viewed in Fig. 2.

Each connecting section 27 is provided with an aperture 32 adapted to receive a pin 33 for holding the two half sections in position when interlocked. The pin 33 is adapted to be held in place by a cotter pin 34 or the equivalent.

The lower end of each half section 16 is provided with a downwardly extending appendage 35 thereon which, when the half sections are assembled as shown in Fig. 4, are spaced from each other. It will be understood that the load to be carried by the conveyor trolley will be suspended in any suitable manner from these appendages 35. Apertures 36 are provided in the appendages 35 for the insertion of any hook supporting pins or other means as desired.

The construction and arrangement whereby the two mating half sections 16 of the trolley unit 10 are interlocked when assembled provides an important advantage. The advantage is that the pin 33 is relieved of the major portion of the load bearing stresses encountered during operation of the trolley unit. Actually, when the trolley unit is being propelled along the mono-rail 11 the inter-lock will be most effective. Those forces which would normally tend to separate the two mating halves of the trolley unit will be compelled to force the interlocking portions into tighter relationship. The pin 33 thereby functions mainly to maintain the parts in their proper relationship when the trolley unit is at rest.

An additional feature of the invention is also illustrated. As noted above, the driving sprocket or gear 13 is provided with a tooth 14 engageable within the centrally located opening formed by the aligned apertures 20. In one form of conveyor trolley currently in use, the trolley unit body section corresponding to the body section 17 of the trolley unit herein described must fit into a notch in the driving sprocket to establish a driving engagement. Although the length of the body section of a conventional trolley unit is not as long as the length of the herein described trolley unit, it is believed readily apparent that the diameter of the driving sprocket must be relatively large in order that the driving engagement between the sprocket and the trolley unit be maintained for a sufficient period of time to cause the trolley unit to be properly propelled along the rail. In other words, the wider the notch that is required to receive the body section corresponding to applicant's body section 17 the greater the radius of curvature of the peripheral surface of the sprocket must be. This means that the driving sprocket must be of relatively large diameter. Further, should it be desired to have the system change direction at the driving sprocket, any corner that would be negotiated necessarily must be in the form of a sweeping curve. Any attempt to negotiate a sharp curve would cause the notch in the driving sprocket to lose engagement with the ends of the center body section. Because of the structure involved in the present invention these disadvantages have been obviated. The driving tooth 14 engages the trolley unit substantially at the center thereof. As a result of the centralized point of engagement of the driving tooth 14 with the trolley unit, smaller diameter driving sprockets may be utilized and sharper corners may be negotiated.

The form of the driving tooth 14 may be as shown in Figs. 1, 3 and 4 or as shown in Figs. 7 and 8. It will be noted in Figs. 1 and 4 that the cable 12 is a segmental cable having cable portions 37 to the ends of which the driving lugs 15 are secured in any convenient manner. When a segmental cable is utilized a driving lug 15 will be contained within the recess formed by the opposed cavities 18—19 on both ends of the body sections 17. Since in this arrangement the cable 12 does not project across or through the opening formed by the apertures 20, the driving tooth may be solid, as shown in Figs. 1 and 4.

In Figs. 7 and 8, the arrangement is illustrated wherein the cable 12 is a continuous member. Accordingly, the cable projects through the opening formed by the aligned apertures 20. The driving tooth, herein designated 38, is slotted as shown in cross-section in Fig. 7. The cutout 39 thus formed provides two relatively thin sections 40 which project between the cable and the upper and lower surfaces of the opening. It will be understood that the driving tooth 38 would be useable with the cable arrangement shown in Fig. 3 but that the tooth 14 would not be usable with the cable arrangement of Fig. 7.

It will be noted in Fig. 8 that the cable is only provided with one driving lug 15. The reason for this is that if two driving lugs 15 were attached to the cable 12, the half sections 16 could not be assembled. It will be noted that the driving lug 15 has a relatively snug fit in the cavity 18. This is necessary to ensure a minimum of movement of the trolley unit relative to the cable, since excessive movement would impair the proper spacing of the various trolley units and interfere with the proper engagement of the trolleys by the driving tooth on the drive gear or sprocket. The cavity 19 in the opposed half section being longer than the cavity 18 provides the necessary clearance to permit the assembly of the half sections by relative lateral movement. But if it were attempted to locate a second lug 14 in the cavity 18 of the opposed half section the half sections could not be assembled. Each half section would be fixed relative to the cable 12 by a lug 15 in engagement with the walls of a cavity 18 and the oversize cavities 19 would be of no value to permit the necessary lateral movement.

It will be understood that one half section could be provided with two cavities 18 and the other with two cavities 19 but then the advantages of being able to manufacture identical half sections would be lost. Left and right hand patterns and dies or molds would be required as well as segregated storage facilities. The two mating halves 16 of the trolley unit 10 being identical in shape may be most economically manufactured. Further, no special marking is required to identify the one side of the trolley unit from the other. By making both half sections as unitary members the further advantages obtained is that a minimum number of surfaces must be machined to ensure an accurate fit when the parts are assembled.

One lug 15 is all that is actually required to effectively associate the trolley unit to the cable. Even in the arrangement shown in Figs. 3 and 5, only one of the lugs 15 is exerting a pulling force on the trolley unit and that is the one ahead of the other in the direction of movement of the trolley unit.

Of course, when a segmental cable is used, the second lug 15 is required to attach the cable end of the following cable to the trolley unit. However, no interference with the assembly of the trolley units is encountered since the driving lugs 15 not being fixed to the same section of cable are relatively movable to each other even though held in position within the respective half sections. No interference with the necessary lateral movement of the half sections during the assembly thereof will be noted.

I claim:

1. In a conveyer system a conveyer trolley comprising a pair of mating half sections, each half section comprising an integral member having a conveyer cable receiving body section adapted to receive a conveyer cable having at least one driving lug secured thereto, each body section having two longitudinally spaced lug receiving recesses therein, one of said recesses being longer than the other, and an upwardly extending arm portion, said body section and arm portion being interposed by an integral connecting section, said connecting section carrying at one vertical edge thereof a tongue element and at the opposite vertical edge a groove element, said tongue coacting with the groove element and said groove element coacting with the tongue element respectively of the mating half section to interlock the two half sections, the interlocking action being caused by moving the two half sections laterally one relative to the other when in face to face contact, said recesses being in the relationship of a long recess opposite a short one when said face sections are in face to face contact, each short recess being adapted to contain a cable lug with a minimum of end clearance thereby preventing any substantial longitudinal movement of said trolley relative to said cable, means projecting through said connecting sections to hold said half sections interlocked, and means carried by said arm portions adapted to movably carry said trolley on a rail.

2. In a conveyer system a conveyer trolley comprising a pair of mating half sections, each half section comprising an integral member having a conveyer cable receiving body section adapted to receive a conveyer cable having at least one driving lug secured thereto, each body section having two longitudinally spaced lug receiving recesses therein, one of said recesses being longer than the other, and an upwardly extending arm portion, said body section and arm portion being interposed by an integral connecting section, said connecting section carrying at one vertical edge thereof a tongue element and at the opposite vertical edge a groove element, said tongue coacting with the groove element and said groove element coacting with the tongue element respectively of the mating half section to interlock the two half sections, the interlocking action being caused by moving the two half sections laterally one relative to the other when in face to face contact, said recesses being in the relationship of a long recess opposite a short one when said face sections are in face to face contact, each short recess being adapted to contain a cable lug with a minimum of end clearance thereby preventing any substantial longitudinal movement of said trolley relative to said cable, means projecting through said connecting sections to hold said half sections interlocked, and means carried by said arm portions adapted to movably carry said trolley on a rail, and each body section being provided with an aperture located centrally of said recesses and adapted to receive a conveyer system driving element tooth for moving said trolley along said rail.

References Cited in the file of this patent

UNITED STATES PATENTS

| | | |
|---|---|---|
| 2,633,226 | Vogt | Mar. 31, 1953 |
| 2,732,929 | Delaney | Jan. 31, 1956 |